(12) United States Patent
Uneura et al.

(10) Patent No.: US 11,187,267 B2
(45) Date of Patent: Nov. 30, 2021

(54) BEARING STRUCTURE (71) Applicant: IHI Corporation, Tokyo (JP)

(72) Inventors: Yutaka Uneura, Tokyo (JP); Takahiro Tanaka, Tokyo (JP); Hiroki Mochizuki, Tokyo (JP); Shunsuke Nishii, Tokyo (JP); Hideyuki Kojima, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 17/089,852

(22) Filed: Nov. 5, 2020

(65) Prior Publication Data
US 2021/0048069 A1 Feb. 18, 2021

Related U.S. Application Data (63) Continuation of application No. PCT/JP2019/019313, filed on May 15, 2019.

(30) Foreign Application Priority Data

Jul. 26, 2018 (JP) .............................. JP2018-140461

(51) Int. Cl.
*F16C 27/04* (2006.01)
*F16C 33/66* (2006.01)
(Continued)

(52) U.S. Cl.
CPC ............ *F16C 27/045* (2013.01); *F16C 19/18* (2013.01); *F16C 33/6685* (2013.01);
(Continued)

(58) Field of Classification Search
CPC ...... F16C 19/18; F16C 19/183; F16C 27/045; F16C 33/6685; F16C 35/042;
(Continued)

(56) References Cited

U.S. PATENT DOCUMENTS

| 2010/0111681 A1 | 5/2010 | Nakano et al. |
| 2014/0086731 A1* | 3/2014 | Schmidt .................. F01D 25/18 415/170.1 |

(Continued)

FOREIGN PATENT DOCUMENTS

| DE | 4021325 C | * 1/1992 |
| JP | 4-11917 U | 1/1992 |

(Continued)

OTHER PUBLICATIONS

International Search Report dated Jul. 9, 2019 in PCT/JP2019/019313 filed May 15, 2019 (with English translation), 4 pages.

*Primary Examiner* — Alan B Waits
(74) *Attorney, Agent, or Firm* — Oblon, McClelland, Maier & Neustadt, L.L.P.

(57) ABSTRACT

Provided is a bearing structure, including: a damper groove formed in at least one of an outer peripheral surface of an outer ring of a rolling bearing or an inner peripheral surface of a bearing hole so as to extend in a circumferential direction of a shaft; and a second oil drain hole having one end communicating with the damper groove, and another end opened to an outside of a cylindrical portion.

8 Claims, 4 Drawing Sheets

(51) Int. Cl.
*F16C 19/18* (2006.01)
*F16C 35/04* (2006.01)

(52) U.S. Cl.
CPC .......... *F16C 19/183* (2013.01); *F16C 35/042* (2013.01); *F16C 2360/24* (2013.01)

(58) Field of Classification Search
CPC .. F16C 35/077; F16C 2360/24; F01D 25/164; F02C 7/06; F05D 2220/40
See application file for complete search history.

(56) References Cited

U.S. PATENT DOCUMENTS

| | | |
|---|---|---|
| 2018/0119572 A1 | 5/2018 | Uneura |
| 2018/0135698 A1* | 5/2018 | Toyota .................... F16C 33/76 |

FOREIGN PATENT DOCUMENTS

| | | | |
|---|---|---|---|
| JP | 9-295203 A | 11/1997 | |
| JP | 2003139134 A * | 5/2003 | ............ F16C 27/045 |
| JP | 2005-171796 A | 6/2005 | |
| JP | 2010-133548 A | 6/2010 | |
| JP | 2011-220273 A | 11/2011 | |
| WO | WO 2008/020483 A1 | 2/2008 | |
| WO | WO 2017/006865 A1 | 1/2017 | |

* cited by examiner

BEARING STRUCTURE

CROSS REFERENCE TO RELATED APPLICATIONS

This application is a continuation application of International Application No. PCT/JP2019/019313, filed on May 15, 2019, which claims priority to Japanese Patent Application No. 2018-140461, filed on Jul. 26, 2018, the entire contents of which are incorporated by reference herein.

BACKGROUND ART

Technical Field

The present disclosure relates to a bearing structure.

A bearing structure includes a housing, rolling bearings, and a shaft. The rolling bearings are arranged in a bearing hole formed in the housing. The shaft is inserted through inner rings of the rolling bearings. In Patent Literature 1, there is a disclosure of a bearing structure in which circumferential grooves are formed in outer rings of the rolling bearings. Lubricating oil is supplied to the circumferential grooves of the outer rings. The lubricating oil supplied to the circumferential groove forms an oil-film damper between an inner peripheral surface of the bearing hole and an outer peripheral surface of the outer ring. The oil-film damper is configured to damp vibration of the shaft.

CITATION LIST

Patent Literature

Patent Literature 1: JP 2005-171796 A1

SUMMARY

Technical Problem

However, when the lubricating oil is excessively accumulated in the circumferential groove, characteristics of the rolling bearing (hereinafter simply referred to as "bearing characteristics") may be degraded due to a mass effect.

The present disclosure has an object to provide a bearing structure capable of curbing degradation in bearing characteristics.

Solution to Problem

In order to solve the above-mentioned problem, according to one embodiment of the present disclosure, there is provided a bearing structure, including: a housing including a cylindrical portion having a bearing hole; a rolling bearing that is arranged in the bearing hole, a shaft being inserted through the rolling bearing; a damper groove formed in at least one of an outer peripheral surface of an outer ring of the rolling bearing or an inner peripheral surface of the bearing hole so as to extend in a circumferential direction of the shaft; and an oil drain hole having one end communicating with the damper groove, and another end opened to an outside of the cylindrical portion.

The housing may have a communication hole that allows communication between the bearing hole and a lubricating-oil supply oil passage, and wherein an oil-drain-hole smallest flow passage sectional area that is smallest in a flow passage sectional area of the oil drain hole may be equal to or smaller than an area obtained by subtracting one-side smallest gap area that is smallest in a gap area defined between the outer ring and the inner peripheral surface of the bearing hole on one side of the damper groove in an axial direction of the shaft and another-side smallest gap area that is smallest in a gap area defined between the outer ring and the inner peripheral surface of the bearing hole on another side of the damper groove in the axial direction from a communication-hole smallest flow passage sectional area that is smallest in a flow passage sectional area of a communication hole.

The one end of the oil drain hole may be formed at a position of the bearing hole on a lowermost side in a vertical direction.

The housing may have a lubricating-oil discharge oil passage on a lower side in the vertical direction with respect to the bearing hole, and wherein an extension line of a center axis of the oil drain hole may intersect with a housing wall surface that faces the lubricating-oil discharge oil passage.

The outer ring may be provided so as to be rotatable with respect to the bearing hole.

Effects of Disclosure

According to the present disclosure, it is possible to curb the degradation in bearing characteristics.

DESCRIPTION OF EMBODIMENTS

Now, with reference to the attached drawings, one embodiment of the present disclosure is described. The dimensions, materials, and specific numerical values represented in the embodiment are merely examples used for facilitating the understanding, and do not limit the present disclosure otherwise particularly noted. Elements having substantially the same functions and configurations herein and in the drawings are denoted by the same reference symbols to omit redundant description thereof. Illustration of elements with no direct relationship to the present disclosure is omitted.

Figure 1:
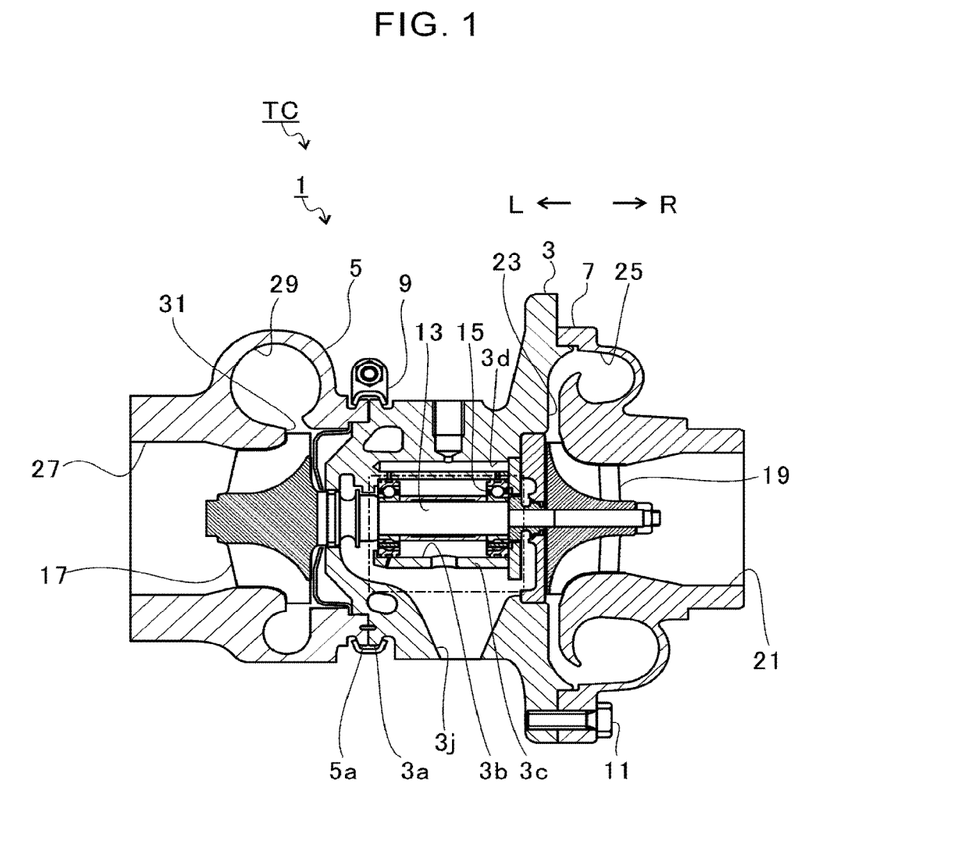
FIG. 1 is a schematic sectional view for illustrating a turbocharger.

FIG. 1 is a schematic sectional view for illustrating a turbocharger TC. In the following, description is given while a direction indicated by the arrow L illustrated in FIG. 1 corresponds to a left side of the turbocharger TC. A direction indicated by the arrow R illustrated in FIG. 1 corresponds to a right side of the turbocharger TC. As illustrated in FIG. 1, the turbocharger TC includes a turbocharger main body 1. The turbocharger main body 1 includes a bearing housing (housing) 3, a turbine housing 5, and a compressor housing 7. The turbine housing 5 is coupled to a left side of the bearing housing 3 by a fastening mechanism 9. The compressor housing 7 is coupled to a right side of the bearing housing 3 by fastening bolts 11.

A protrusion 3a is formed on an outer peripheral surface of the bearing housing 3. The protrusion 3a is formed on the turbine housing 5 side. The protrusion 3a protrudes in a radial direction of the bearing housing 3. A protrusion 5a is formed on an outer peripheral surface of the turbine housing 5. The protrusion 5a is formed on the bearing housing 3 side. The protrusion 5a protrudes in a radial direction of the turbine housing 5. The bearing housing 3 and the turbine housing 5 are band-fastened by the fastening mechanism 9. The fastening mechanism 9 is formed of, for example, a G coupling. The fastening mechanism 9 are configured to clamp the protrusions 3a and 5a.

The bearing housing 3 includes a cylindrical portion 3c having a bearing hole 3b. The bearing hole 3b passes through in a right-and-left direction of the turbocharger TC. The cylindrical portion 3c has a substantially cylindrical shape. A shaft 13 is inserted through the bearing hole 3b. A pair of rolling bearings 15 are accommodated in the bearing hole 3b. The rolling bearings 15 are, for example, ball bearings. The shaft 13 is inserted through the rolling bearings 15. The rolling bearings 15 rotatably supports the shaft 13. A turbine impeller 17 is provided at a left end portion of the shaft 13. The turbine impeller 17 is rotatably accommodated in the turbine housing 5. A compressor impeller 19 is provided at a right end portion of the shaft 13. The compressor impeller 19 is rotatably accommodated in the compressor housing 7.

An intake port 21 is formed in the compressor housing 7. The intake port 21 is opened on the right side of the turbocharger TC. The intake port 21 is connected to an air cleaner (not shown). A diffuser flow passage 23 is defined by the opposing surfaces of the bearing housing 3 and the compressor housing 7. The diffuser flow passage 23 increases pressure of air. The diffuser flow passage 23 has an annular shape. The diffuser flow passage 23 communicates with the intake port 21 on a radially inner side through the compressor impeller 19.

A compressor scroll flow passage 25 is formed in the compressor housing 7. The compressor scroll flow passage 25 has an annular shape. The compressor scroll flow passage 25 is located, for example, on an outer side with respect to the diffuser flow passage 23 in a radial direction of the shaft 13. The compressor scroll flow passage 25 communicates with an intake port of an engine (not shown) and the diffuser flow passage 23. When the compressor impeller 19 rotates, the air is sucked from the intake port 21 into the compressor housing 7. The sucked air is pressurized and accelerated in the course of flowing through blades of the compressor impeller 19. The pressurized and accelerated air is pressurized in the diffuser flow passage 23 and the compressor scroll flow passage 25. The pressurized air is led to the intake port of the engine.

A discharge port 27 is formed in the turbine housing 5. The discharge port 27 is opened on the left side of the turbocharger TC. The discharge port 27 is connected to an exhaust gas purification device (not shown). A turbine scroll flow passage 29 and a communication flow passage 31 are formed in the turbine housing 5. The turbine scroll flow passage 29 has an annular shape. The turbine scroll flow passage 29 is located, for example, on an outer side with respect to the communication flow passage 31 in a radial direction of the turbine impeller 17. The turbine scroll flow passage 29 communicates with a gas inflow port (not shown). Exhaust gas discharged from an exhaust manifold (not shown) of the engine is led to the gas inflow port. The communication flow passage 31 communicates with the turbine scroll flow passage 29. The communication flow passage 31 communicates with the discharge port 27 on a radially inner side through the turbine impeller 17. Thus, the exhaust gas led from the gas inflow port to the turbine scroll flow passage 29 is led to the discharge port 27 through the communication flow passage 31 and the turbine impeller 17. The exhaust gas led to the discharge port 27 rotates turbine impeller 17 in the course of flowing therethrough.

A rotational force of the turbine impeller 17 is transmitted to the compressor impeller 19 through the shaft 13. When the compressor impeller 19 rotates, the pressure of the air is increased as described above. In such a manner, the air is led to the intake port of the engine.

Figure 2:
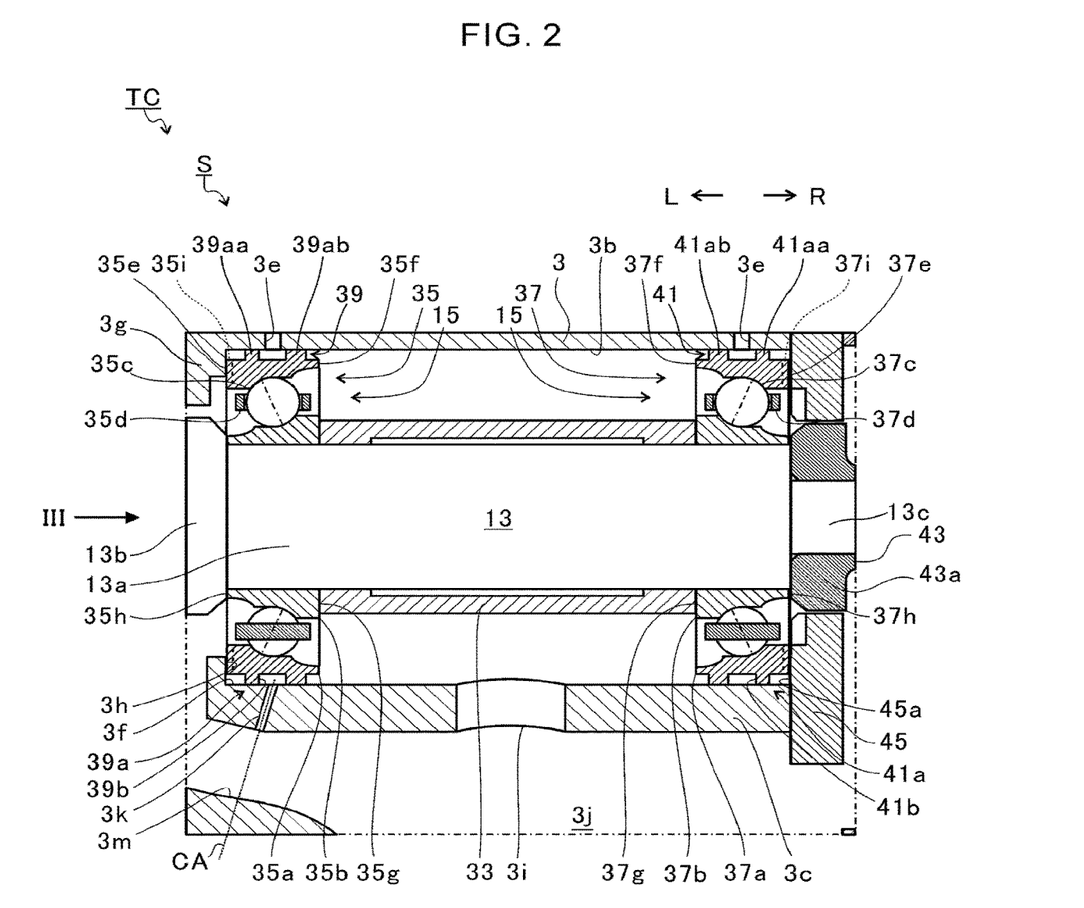
FIG. 2 is an extracted view for illustrating a portion indicated by the one-dot chain lines of FIG. 1.

FIG. 2 is an extracted view for illustrating a portion indicated by the one-dot chain lines of FIG. 1. As illustrated in FIG. 2, the turbocharger TC has a bearing structure S. The bearing structure S includes the cylindrical portion 3c of the bearing housing 3, the shaft 13, the pair of rolling bearings 15, and a spacer 33.

A lubricating-oil supply oil passage 3d (see FIG. 1) is formed in the bearing housing 3. The lubricating-oil supply oil passage 3d is located on an upper side in the vertical direction (upper side of FIG. 2) with respect to the bearing hole 3b. Lubricating oil fed out from a pump (not shown) is introduced into the lubricating-oil supply oil passage 3d. A pair of communication holes 3e are formed between the lubricating-oil supply oil passage 3d and the bearing hole 3b. The pair of communication holes 3e are spaced apart from each other in an axial direction of the shaft 13 (hereinafter simply referred to as "axial direction"). The communication hole 3e has one end connected to the lubricating-oil supply oil passage 3d and another end connected to the bearing hole 3b. For example, the connecting end of the communication hole 3e connected to the bearing hole 3b is formed at an uppermost position of the bearing hole 3b in the vertical direction. The communication holes 3e allow communication between the lubricating-oil supply oil passage 3d and the bearing hole 3b.

The pair of rolling bearings 15 are arranged in the bearing hole 3b. The pair of rolling bearings 15 are spaced apart from each other in the axial direction. In the following, when the pair of rolling bearings 15 are separately referred to, the rolling bearing 15 on a left side of FIG. 2 (turbine impeller 17 side (see FIG. 1)) is referred to as "turbine-side bearing 35". The rolling bearing 15 on a right side of FIG. 2 (compressor impeller 19 side (see FIG. 1)) is referred to as "compressor-side bearing 37".

The turbine-side bearing 35 includes an outer ring 35a, an inner ring 35b, rolling elements 35c, and a cage 35d. The inner ring 35b is mounted to an outer peripheral surface of the shaft 13. The inner ring 35b rotates integrally with the shaft 13. The outer ring 35a is arranged on a radially outer side with respect to the inner ring 35b. The outer ring 35a is arranged so as to be opposed to an inner peripheral surface 3f of the bearing hole 3b. The outer ring 35a is arranged at a position opposed to the communication hole 3e in a radial direction of the shaft 13 (hereinafter simply referred to as "radial direction"). A damper portion 39 described later is formed in an outer peripheral surface of the outer ring 35a.

The plurality of rolling elements 35c are arranged between the outer ring 35a and the inner ring 35b. The plurality of rolling elements 35c are arranged along a rotation direction of the shaft 13 (hereinafter simply referred to as "rotation direction" or "circumferential direction"). The cage 35d is configured to retain the plurality of rolling elements 35c. Intervals of the plurality of rolling elements 35c in the circumferential direction are maintained at predetermined intervals by the cage 35d.

The compressor-side bearing 37 includes an outer ring 37a, an inner ring 37b, rolling elements 37c, and a cage 37d. The inner ring 37b is mounted to the outer peripheral surface of the shaft 13. The inner ring 37b rotates integrally with the shaft 13. The outer ring 37a is arranged on a radially outer side with respect to the inner ring 37b. The outer ring 37a is arranged so as to be opposed to the inner peripheral surface 3f of the bearing hole 3b. The outer ring 37a is arranged at a position opposed to the communication hole 3e in the radial direction. A damper portion 41 described later is formed in an outer peripheral surface of the outer ring 37a.

The plurality of rolling elements 37c are arranged between the outer ring 37a and the inner ring 37b. The plurality of rolling elements 37c are arranged along the circumferential direction. The cage 37d is configured to retain the plurality of rolling elements 37c. Intervals of the plurality of rolling elements 37c in the circumferential direction are maintained at predetermined intervals by the cage 37d.

The pair of rolling bearings 15 are, for example, a pair of angular contact bearings. In FIG. 2, the center lines (hereinafter also referred to as "connection lines") representing contact angles of the angular contact bearings are indicated by the two-dot chain lines. The connection line is inclined (forms a contact angle) with respect to a line (plane) perpendicular to the axial direction of the shaft 13. The angular contact bearings receive thrust loads in addition to radial loads of the shaft 13. The pair of angular contact bearings receive thrust loads in directions opposite to each other. The pair of angular contact bearings are arranged, for example, in a face-to-face duplex combination (combination in which the contact angles form directions of lines separating away from each other toward the outer ring side).

The outer ring 35a of the turbine-side bearing 35 has an end surface 35e and an end surface 35f at both ends in the axial direction. The end surface 35e is located on a side of the outer ring 35a on which the pair of rolling bearings 15 are spaced apart from each other. The end surface 35f is located on a side of the outer ring 35a on which the pair of rolling bearings 15 approach each other. The end surface 35e has a thickness larger than that of the end surface 35f. The inner ring 35b has an end surface 35g and an end surface 35h at both ends in the axial direction. The end surface 35g is located on a side of the inner ring 35b on which the pair of rolling bearings 15 approach each other. The end surface 35h is located on a side of the inner ring 35b on which the pair of rolling bearings 15 are spaced apart from each other. The end surface 35g has a thickness larger than that of the end surface 35h.

As described above, the outer ring 35a and the inner ring 35b each have a thickness (thickness in the radial direction) that differs at both end surfaces in the axial direction. The outer diameter of the inner ring 35b increases from the turbine impeller 17 side (see FIG. 1) toward the compressor impeller 19 side (see FIG. 1). The inner diameter of the outer ring 35a increases from the turbine impeller 17 side toward the compressor impeller 19 side.

The outer ring 37a of the compressor-side bearing 37 has an end surface 37e and an end surface 37f at both ends in the axial direction. The end surface 37e is located on a side of the outer ring 37a on which the pair of rolling bearings 15 are spaced apart from each other. The end surface 37f is located on a side of the outer ring 37a on which the pair of rolling bearings 15 approach each other. The end surface 37e has a thickness larger than that of the end surface 37f. The inner ring 37b has an end surface 37g and an end surface 37h on both ends in the axial direction. The end surface 37g is located on a side of the inner ring 37b on which the pair of rolling bearings 15 approach each other. The end surface 37h is located on a side of the inner ring 37b on which the pair of rolling bearings 15 are spaced apart from each other. The end surface 37g has a thickness larger than that of the end surface 37h.

As described above, the outer ring 37a and the inner ring 37b each have a thickness (thickness in the radial direction) that differs at both end surfaces in the axial direction. The outer diameter of the inner ring 37b increases from the compressor impeller 19 side (see FIG. 1) toward the turbine impeller 17 side (see FIG. 1). The inner diameter of the outer ring 37a increases from the compressor impeller 19 side toward the turbine impeller 17 side.

However, the above-mentioned configuration that the thicknesses are different at the both end surfaces in the axial direction may be applied only to any one of the outer rings 35a and 37a and the inner rings 35b and 37b. For example, the both end surfaces of the outer rings 35a and 37a in the axial direction may have different in thicknesses, and the both end surfaces of the inner rings 35b and 37b in the axial direction may have the same thickness. Moreover, the both end surfaces of the inner rings 35b and 37b in the axial direction may have different in thicknesses, and the both end surfaces of the outer rings 35a and 37a in the axial direction may have the same thickness. Further, the configuration that the thickness differs at the both end surfaces in the axial direction described above is not an essential configuration. The outer rings 35a and 37a and the inner rings 35b and 37b may have the same thickness at the both end surfaces in the axial direction.

The spacer (inner ring spacer) 33 is arranged between the inner ring 35b and the inner ring 37b. The spacer 33 is an annular member. The shaft 13 is inserted through the spacer 33. An outer diameter of the spacer 33 is smaller than the outer diameter of the end surfaces 35g and 37g of the inner rings 35b and 37b. However, the outer diameter of the spacer 33 may be equal to or larger than the outer diameter of the end surfaces 35g and 37g of the inner rings 35b and 37b. Here, a description has been given of the case in which the spacer 33 is provided between the inner ring 35b and the inner ring 37b. However, a spring and a spring receiver may be provided in place of the spacer 33.

A spacer (outer ring spacer), a spring, or a spring receiver is not provided between the outer ring 35a and the outer ring 37a. That is, a retaining member configured to retain the outer rings 35a and 37a is not provided between the outer ring 35a and the outer ring 37a. Therefore, the outer rings 35a and 37a are rotatably arranged (freely rotatable) in the circumferential direction with respect to the bearing hole 3b. When the shaft 13 rotates, the inner rings 35b and 37b rotate integrally with the shaft 13. The rolling elements 35c and 37c rotate along with the rotation of the inner rings 35b and 37b. The rolling elements 35c and 37c move in the circumferential directions of the inner rings 35b and 37b. The outer rings 35a and 37a rotate in the circumferential direction of the shaft 13 along with the rotation and the movement of the rolling elements 35c and 37c, or along with the flow of the lubricating oil. At this time, a rotational speed of the outer rings 35a and 37a is slower than a rotational speed of the inner rings 35b and 37b.

The shaft 13 includes a small-diameter portion 13a, a large-diameter portion 13b, and a reduced-diameter portion 13c. The inner rings 35b and 37b are mounted to the small-diameter portion 13a. The large-diameter portion 13b has a diameter larger than that of the small-diameter portion 13a and is formed integrally with the shaft 13. The reduced-diameter portion 13c has a diameter smaller than that of the small-diameter portion 13a and is formed integrally with the shaft 13. The large-diameter portion 13b is located on the left side of FIG. 2 with respect to the small-diameter portion 13a. The reduced-diameter portion 13c is located on the right side of FIG. 2 with respect to the small-diameter portion 13a.

However, the large-diameter portion 13b may be formed of a member separate from the small-diameter portion 13a. The large-diameter portion 13b may be configured so as to be removable from the small-diameter portion 13a. The reduced-diameter portion 13c may be formed of a member separate from the small-diameter portion 13a. The reduced-diameter portion 13c may be configured so as to be removable from the small-diameter portion 13a. The outer diameter of the large-diameter portion 13b is equal to or larger than the outer diameter of the end surface 35h of the inner ring 35b. The inner ring 35b is positioned by the large-diameter portion 13b.

An oil thrower member 43 is mounted to the reduced-diameter portion 13c. The oil thrower member 43 is configured to scatter the lubricating oil toward the radially outer side. The oil thrower member 43 is configured to curb leakage of the lubricating oil toward the compressor impeller 19 side (see FIG. 1).

The oil thrower member 43 includes a large-diameter portion 43a. The large-diameter portion 43a has a diameter larger than that of the small-diameter portion 13a. The outer diameter of the large-diameter portion 43a is equal to or larger than the outer diameter of the end surface 37h of the inner ring 37b. The inner ring 37b is positioned by the oil thrower member 43. The maximum outer diameter of the large-diameter portion 43a is equal to the maximum outer diameter of the large-diameter portion 13b. In this description, the meaning of "equal" includes completely equal and, deviating from completely equal within the range of tolerances (machining precisions, assembly errors, and the like). However, the maximum outer diameter of the large-diameter portion 43a may be different from the maximum outer diameter of the large-diameter portion 13b.

A lateral wall portion 3g is formed on the bearing housing 3. The lateral wall portion 3g is located on the side on which the pair of rolling bearings 15 are spaced apart from each other (turbine impeller 17 side (see FIG. 1)) with respect to the outer ring 35a. The lateral wall portion 3g protrudes toward the radially inner side from the inner peripheral surface 3f of the bearing hole 3b. The lateral wall portion 3g has an opposing surface 3h. The opposing surface 3h is opposed to the end surface 35e of the outer ring 35a in the axial direction.

A seal plate 45 is mounted to the bearing housing 3 on the radially outer side with respect to the oil thrower member 43. The seal plate 45 has an opposing surface 45a. The opposing surface 45a is opposed to the end surface 37e of the outer ring 37a in the axial direction. The seal plate 45 is configured to curb the leakage of the lubricating oil from the bearing hole 3b toward the compressor impeller 19 side (see FIG. 1).

The inner ring 35b, the spacer 33, the inner ring 37b, the oil thrower member 43, and the compressor impeller (see FIG. 1) are sequentially inserted from an end portion of the shaft 13 on the compressor impeller 19 side. A fastening bolt is fastened to the end portion of the shaft 13 on the compressor impeller 19 side. Compression stress (axial force) is applied to the inner ring 35b, the spacer 33, the inner ring 37b, the oil thrower member 43, and the compressor impeller 19 in the axial direction. The inner ring 35b, the spacer 33, and the inner ring 37b are clamped between the large-diameter portion 13b and the oil thrower member 43 by the axial force, and rotate integrally with the shaft 13.

The damper portion 39 is formed in the outer peripheral surface of the turbine-side bearing 35 (outer ring 35a). The damper portion 41 is formed in the outer peripheral surface of the compressor-side bearing 37 (outer ring 37a). The damper portions 39 and 41 are opposed to the inner peripheral surface 3f of the bearing hole 3b.

The damper portion 39 includes two annular protrusions 39a. The two annular protrusions 39a are formed on the outer peripheral surface of the outer ring 35a so as to be spaced apart from each other in the axial direction. The two annular protrusions 39a protrude toward the radially outer side from the outer ring 35a. The two annular protrusions 39a extend in an annular shape over the entire circumference of the outer peripheral surface of the outer ring 35a. A damper groove 39b is defined between the two annular protrusions 39a. The damper groove 39b extends in an annular shape over the entire circumference of the outer peripheral surface of the outer ring 35a.

The damper portion 41 includes two annular protrusions 41a. The two annular protrusions 41a are formed on the outer peripheral surface of the outer ring 37a so as to be spaced apart from each other in the axial direction. The two annular protrusions 41a protrude from the outer ring 37a toward the radially outer side. The two annular protrusions 41a extend in an annular shape over the entire circumference of the outer peripheral surface of the outer ring 37a. A damper groove 41b is formed between the two annular protrusions 41a. The damper groove 41b extends in an annular shape over the entire circumference of the outer peripheral surface of the outer ring 37a. The damper grooves 39b and 41b extend in the circumferential direction of the shaft 13.

On the inner peripheral surface 3f of the bearing hole 3b, the communication hole 3e is opened between positions facing the two annular protrusions 39a. On the inner peripheral surface 3f of the bearing hole 3b, the communication hole 3e is opened between positions facing the two annular protrusions 41a. That is, the damper grooves 39b and 41b are opposed to the communication holes 3e in the radial direction. The communication holes 3e communicate with the damper grooves 39b and 41b.

The lubricating oil is supplied to the communication holes 3e from the lubricating-oil supply oil passage 3d (see FIG. 1). The lubricating oil passes through the communication holes 3e and supplied to the damper grooves 39b and 41b. The lubricating oil flows through the damper grooves 39b and 41b in the circumferential direction. The lubricating oil flows through gaps (spaces) between the two annular protrusions 39a and 41a and the inner peripheral surface 3f of the bearing hole 3b. The lubricating oil forms oil films (oil-film dampers) between the outer peripheral surface of the outer rings 35a and 37a and the inner peripheral surface 3f of the bearing hole 3b. The oil-film damper is configured to damp a vibration of the shaft 13.

The effect of damping the vibration of the shaft 13 can be changed (adjusted) by changing the shapes of the two annular protrusions 39a and 41a. The effect of damping the vibration of the shaft 13 can be changed without changing the shapes of the entire outer rings 35a and 37a. Therefore, it is easy to design the outer rings 35a and 37a including the damper portions 39 and 41.

Between the two annular protrusions 39a, the annular protrusion 39a on the turbine impeller 17 side (see FIG. 1) is referred to as "first protrusion 39aa". Between the two annular protrusions 39a, the annular protrusion 39a on the compressor impeller 19 side (see FIG. 1) is referred to as "second protrusion 39ab". Between the two annular protrusions 41a, the annular protrusion 41a on the compressor impeller 19 side is referred to as "first protrusion 41aa". Between the two annular protrusions 41a, the annular protrusion 41a on the turbine impeller 17 side is referred to as "second protrusion 41ab".

The second protrusions 39ab and 41ab are located toward a direction in which the pair of rolling bearings 15 approach each other with respect to the first protrusions 39aa and 41aa. A width of the first protrusions 39aa and 41aa in the axial direction is smaller than a width of the second protrusions 39ab and 41ab, respectively, in the axial direction.

The lubricating oil supplied to the damper grooves 39b and 41b flows in the circumferential direction along the damper grooves 39b and 41b. When the damper grooves 39b and 41b is filled with the lubricating oil, the lubricating oil flows over the first protrusions 39aa and 41aa and the second protrusions 39ab and 41ab, and flows in the axial direction between the outer peripheral surface of the outer rings 35a and 37a and the inner peripheral surface 3f of the bearing hole 3b. At this time, the lubricating oil flows more easily (smaller resistance) through the gap between the first protrusions 39aa and 41aa and the inner peripheral surface 3f of the bearing hole 3b, than through the gap between the second protrusions 39ab and 41ab and the inner peripheral surface 3f of the bearing hole 3b. Therefore, the lubricating oil supplied to the damper grooves 39b and 41b easily flows from the first protrusion 39aa and 41aa sides.

Accordingly, the amount of the lubricating oil flowing on the end surface 35e and 37e sides of the outer rings 35a and 37a is secured. The lubricating oil flows on the end surface 35e and 37e sides so that the outer rings 35a and 37a are pressed by the lubricating oil toward the side on which the pair of rolling bearings 15 approach each other. The outer rings 35a and 37a are pressed toward the side on which the pair of rolling bearings 15 approach each other, thereby stabilizing the positions of the turbine-side bearing 35 and the compressor-side bearing 37. However, a width of the first protrusions 39aa and 41aa in the axial direction may be equal to or larger than a width of the second protrusions 39ab and 41ab, respectively, in the axial direction.

Groove portions 35i are formed in the end surface 35e. The groove portions 35i pass through the outer ring 35a from the outer peripheral surface to the inner peripheral surface. Groove portions 37i are formed in the end surface 37e. The groove portions 37i pass through the outer ring 37a from the outer peripheral surface to the inner peripheral surface. However, the groove portions 35i and 37i may not be formed in both of the outer rings 35a and 37a. For example, the groove portions 35i may be formed in the outer ring 35a, and the groove portions 37i may not be formed in the outer ring 37a. Further, the groove portions 35i may not be formed in the outer ring 35a, and the groove portions 37i may be formed in the outer ring 37a.

Figure 3:
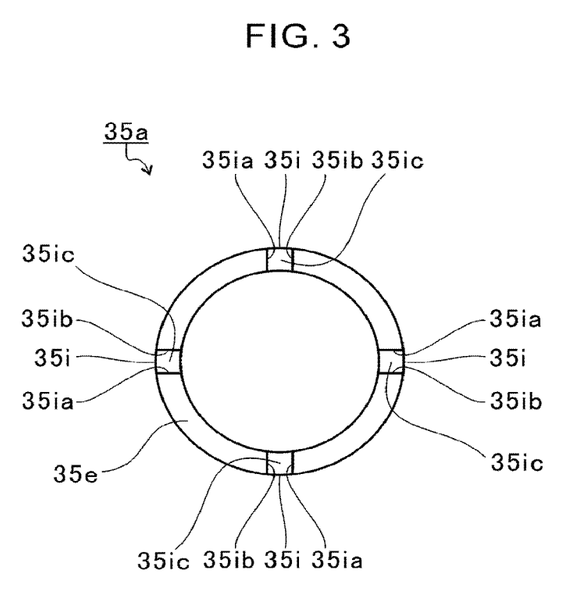
FIG. 3 is a sectional view of an outer ring of FIG. 2 as seen in a direction indicated by the arrow III.

FIG. 3 is a sectional view of the outer ring 35a of FIG. 2 as seen in a direction indicated by the arrow III. Note that a shape of the groove portion 35i in the outer ring 35a is the same as the shape of the groove portion 37i in the outer ring 37a. Therefore, a description is now given of the shape of the groove portion 35i in the outer ring 35a, and a description of the shape of the groove portion 37i in the outer ring 37a is omitted.

As illustrated in FIG. 3, the groove portion 35i extends along the radial direction of the outer ring 35a. However, the groove portion 35i may slantly extend with respect to the radial direction. The groove portion 35i includes a left-side surface 35ia, a right-side surface 35ib, and a bottom surface 35ic. The left-side surface 35ia and the right-side surface 35ib extend along the radial direction of the outer ring 35a. The bottom surface 35ic is a flat surface parallel with the radial direction of the outer ring 35a and parallel with the end surface 35e.

A width of the groove portion 35i in the circumferential direction (that is, a distance between the left-side surface 35ia and the right-side surface 35ib) is constant irrespective of a position in the radial direction. However, a width of the groove portion 35i in the circumferential direction may be changed in accordance with the position in the radial direction. For example, the width of the groove portion 35i in the circumferential direction may be changed so as to decrease from the radially inner side toward the radially outer side. Further, the width of the groove portion 35i in the circumferential direction may be changed so as to increase from the radially inner side toward the radially outer side.

A plurality of groove portions 35i are formed in the circumferential direction of the end surface 35e. In this embodiment, four groove portions 35i are arranged at intervals of 90° in the circumferential direction of the end surface 35e. However, the number of the groove portions 35i is not limited to four, and it is only required that the number of the groove portions 35i be one or more. Moreover, the intervals of the groove portions 35i in the circumferential direction are not limited to the equal intervals, and may be unequal intervals.

Returning to FIG. 2, the lubricating oil leaking from the first protrusion 39aa of the two annular protrusions 39a flows downward through the gap between the end surface 35e of the outer ring 35a and the opposing surface 3h of the lateral wall portion 3g. The lubricating oil flows downward through the gap between the groove portions 35i in the outer ring 35a and the opposing surface 3h of the lateral wall portion 3g.

Similarly, the lubricating oil leaking from the first protrusion 41aa of the two annular protrusions 41a flows downward through the gap between the end surface 37e of the outer ring 37a and the opposing surface 45a of the seal plate 45. The lubricating oil flows downward through the gap between the groove portions 37i in the outer ring 37a and the opposing surface 45a of the seal plate 45. The groove portions 35i and 37i is configured to allow the lubricating oil to be easily led from the radially outer side toward the radially inner side of the outer rings 35a and 37a. The lubricating oil led to the radially inner side of the outer rings 35a and 37a comes into contact with the rolling elements 35c and 37c. With the groove portions 35i and 37i, the lubricating oil is efficiently led to the rolling elements 35c and 37c.

The end surfaces 35e and 37e of the outer rings 35a and 37a function as a thrust bearing surface. A thrust load that is applied toward the compressor impeller 19 side (see FIG. 1) is applied from the end surface 37e of the outer ring 37a toward the opposing surface 45a of the seal plate 45. A thrust load that is applied toward the turbine impeller 17 side (see FIG. 1) is applied from the end surface 35e of the outer ring 35a toward the opposing surface 3h of the lateral wall portion 3g. The vibration of the shaft 13 in a thrust direction is damped by the lubricating oil in the gap between the end surfaces 35e and 37e and the opposing surfaces 3h and 45a.

The lubricating oil lubricating the rolling elements 35c and 37c flows out to a center portion of the inner peripheral surface 3f of the bearing hole 3b. A first oil drain hole 3i is formed in the center portion of the inner peripheral surface 3f of the bearing hole 3b. The first oil drain hole 3i has one end opened to the inner peripheral surface 3f of the bearing hole 3b, and another end opened to an outside of the cylindrical portion 3c. The first oil drain hole 3i passes through the cylindrical portion 3c to a lower side (lower side of FIG. 2) in the vertical direction. The first oil drain hole 3i is configured to allow the lubricating oil in the bearing hole 3b to be discharged to an outside of the bearing hole 3b. Accordingly, the lubricating oil flowing out to the center portion of the inner peripheral surface 3f of the bearing hole 3b passes through the first oil drain hole 3i, and is discharged from the bearing hole 3b.

The lubricating oil discharged from the bearing hole 3b (cylindrical portion 3c) flows downward to the lower side with respect to the bearing hole 3b (cylindrical portion 3c) in the vertical direction. A lubricating-oil discharge oil passage (lubricating-oil discharge port) 3j is formed in the bearing housing 3 on the lower side in the vertical direction with respect to the bearing hole 3b (cylindrical portion 3c). The lubricating oil flowing downward to the lower side with respect to the bearing hole 3b passes through the lubricating-oil discharge oil passage 3j, and is discharged from the bearing housing 3.

When the lubricating oil is excessively accumulated in the damper grooves 39b and 41b, the bearing characteristics of the pair of rolling bearings 15 may be degraded due to a mass effect. In view of this, in this embodiment, the cylindrical portion 3c has a second oil drain hole (oil drain hole) 3k separately provided from the first oil drain hole 3i. The second oil drain hole 3k is arranged, for example, at a position of the inner peripheral surface 3f of the bearing hole 3b opposed to the damper groove 39b. The second oil drain hole 3k has one end communicating with the damper groove 39b, and another end opened to the outside of the cylindrical portion 3c. The second oil drain hole 3k is configured to allow the lubricating oil in the damper groove 39b to be discharged to the outside of the cylindrical portion 3c. Accordingly, the second oil drain hole 3k can curb excessive accumulation of the lubricating oil in the damper groove 39b. As a result, degradation in bearing characteristics of the turbine-side bearing 35 can be curbed.

A communication port (one end) of the second oil drain hole 3k that communicates with the damper groove 39b is formed at a position of the bearing hole 3b on the lowermost side in the vertical direction. Accordingly, the communication port of the second oil drain hole 3k is formed at a position of the bearing hole 3b circumferentially farthest from the position where the bearing hole 3b and the communication hole 3e communicate with each other. The lubricating oil supplied from the communication hole 3e to the damper groove 39b cools the outer peripheral surface of the outer ring 35a and the inner peripheral surface 3f of the bearing hole 3b while flowing along the damper groove 39b. That is, the lubricating oil can collect heat while flowing from the communication hole 3e to the second oil drain hole 3k. The communication port of the second oil drain hole 3k is formed at the position of the bearing hole 3b on the lowermost side in the vertical direction so that the lubricating oil can effectively cool the rolling bearings 15 and the bearing housing 3.

The amount of the lubricating oil supplied from the communication holes 3e into the bearing hole 3b is determined in accordance with flow passage sectional areas of the communication holes 3e. The amount of the lubricating oil discharged from the second oil drain hole 3k to the outside of the cylindrical portion 3c is determined in accordance with the flow passage sectional area of the second oil drain hole 3k. In this embodiment, the communication holes 3e and the second oil drain hole 3k each have a constant inner diameter. However, the communication holes 3e and the second oil drain hole 3k may each have a portion whose inner diameter is changed.

The amount of the lubricating oil that flows over the first protrusions 39aa and 41aa is determined in accordance with gap areas defined between the outer peripheral surface of the first protrusions 39aa and 41aa and the inner peripheral surface 3f of the bearing hole 3b. The amount of the lubricating oil that flows over the second protrusions 39ab and 41ab is determined in accordance with the gap area defined between the outer peripheral surface of the second protrusions 39ab and 41ab and the inner peripheral surface 3f of the bearing hole 3b.

Here, the flow passage sectional area which is the smallest in the flow passage sectional area of the second oil drain hole 3k is referred to as "oil-drain-hole smallest flow passage sectional area". The flow passage sectional area which is the smallest in the flow passage sectional area of the communication hole 3e is referred to as "communication-hole smallest flow passage sectional area". The gap area which is the smallest in the gap area defined between the outer peripheral surface of the outer rings 35a and 37a and the inner peripheral surface 3f of the bearing hole 3b on one side of the damper grooves 39b and 41b in the axial direction of the shaft 13 is referred to as "one-side smallest gap area". The gap area which is the smallest in the gap area defined between the outer peripheral surface of the outer rings 35a and 37a and the inner peripheral surface 3f of the bearing hole 3b on another side of the damper grooves 39b and 41b in the axial direction of the shaft 13 is referred to as "another-side smallest gap area".

In this case, the oil-drain-hole smallest flow passage sectional area is equal to or smaller than the area obtained by subtracting the one-side smallest gap area and the another-side smallest gap area from the communication-hole smallest flow passage sectional area. When the oil-drain-hole smallest flow passage sectional area satisfies the above-mentioned condition, the oil-film damper is easily formed between the outer peripheral surface of the outer rings 35a and 37a and the inner peripheral surface 3f of the bearing hole 3b. As a result, the vibration of the shaft 13 can be damped by the oil-film damper. In contrast, when the oil-drain-hole smallest flow passage sectional area does not satisfy the above-mentioned condition, the oil-film damper is difficult to be formed between the outer peripheral surface of outer rings 35a and 37a and the inner peripheral surface 3f of the bearing hole 3b. Therefore, the vibration of the shaft 13 is difficult to be damped.

The second oil drain hole 3k extends along a center axis CA indicated by the broken line in FIG. 2. The lubricating oil discharged from the second oil drain hole 3k flows downward to the lower side in the vertical direction along the center axis CA of the second oil drain hole 3k. The extension line of the center axis CA of the second oil drain hole 3k is directed toward the turbine housing 5 side (see FIG. 1) with respect to the lubricating-oil discharge oil passage 3j. The extension line of the center axis CA of the second oil drain hole 3k intersects with a housing wall surface 3m that faces the lubricating-oil discharge oil passage 3j. Accordingly, the second oil drain hole 3k can allow the lubricating oil to be brought into contact with the housing wall surface 3m. The lubricating oil is brought into contact with the housing wall surface 3m, thereby being capable of cooling the housing wall surface 3m. The housing wall surface 3m is formed, for example, on the turbine housing 5 side with respect to the lubricating-oil discharge oil passage 3j. Therefore, the lubricating oil discharged from the second oil drain hole 3k can cool the turbine housing 5 through the housing wall surface 3m.

In this embodiment, the outer rings 35a and 37a are arranged so as to be rotatable (freely rotatable) in the circumferential direction of the shaft 13 with respect to the bearing hole 3b. The outer rings 35a and 37a are arranged so as to be rotatable with respect to the bearing hole 3b, so that the pair of rolling bearings 15 can obtain a squeeze effect (spring effect) and a wedge effect of the lubricating oil. The squeeze effect is a phenomenon that, when the vibrating outer rings 35a and 37a approach the bearing hole 3b, resistance forces are generated to the outer rings 35a and 37a due to a flow and compression of the lubricating oil. The wedge effect is a phenomenon that, when the outer rings 35a and 37a rotate, the lubricating oil is drawn toward the position where the outer rings 35a and 37a and the bearing hole 3b approach each other, and thereby resistance forces are generated to the outer rings 35a and 37a due to a flow and compression of the lubricating oil. Accordingly, in the bearing structure S of this embodiment, the vibration of the shaft 13 can be absorbed (damped) as compared to the case in which the outer rings 35a and 37a are configured to be non-rotatable with respect to the bearing hole 3b. Further, the retaining member configured to retain the outer rings 35a and 37a (pin for preventing the rotation) is not required, thereby reducing the number of components.

In the bearing structure S of this embodiment, the damper portions 39 and 41 are formed in the outer rings 35a and 37a. That is, the outer rings 35a and 37a are used as damper members. Since the outer rings 35a and 37a are used as damper members, an annular case member (so-called oil film damper member) is not required to be arranged in the bearing hole 3b separately. Since the damper members are formed in the outer rings 35a and 37a, the weight of the damper members can be reduced as compared to the case in which the oil film damper member is provided separately. Since the weight of the damper members are reduced, it is possible to increase the force of damping the vibration of the shaft 13.

In this embodiment, a description is given of the example in which the second oil drain hole 3k is arranged at the position opposed to the damper groove 39b in the inner peripheral surface 3f of the bearing hole 3b. However, the configuration is not limited thereto, and the second oil drain hole 3k may be arranged at a position opposed to the damper groove 41b in the inner peripheral surface 3f of the bearing hole 3b. In this case, the second oil drain hole 3k has one end communicating with the damper groove 41b, and another end opened to the outside of the cylindrical portion 3c. Further, a plurality of second oil drain holes 3k may be arranged at positions opposed to the damper groove 39b and the damper groove 41b in the inner peripheral surface 3f of the bearing hole 3b. That is, it is only required that the second oil drain hole 3k be arranged at a position opposed to at least one of the damper groove 39b or the damper groove 41b in the inner peripheral surface 3f of the bearing hole 3b.

Modification Example

Figure 4:
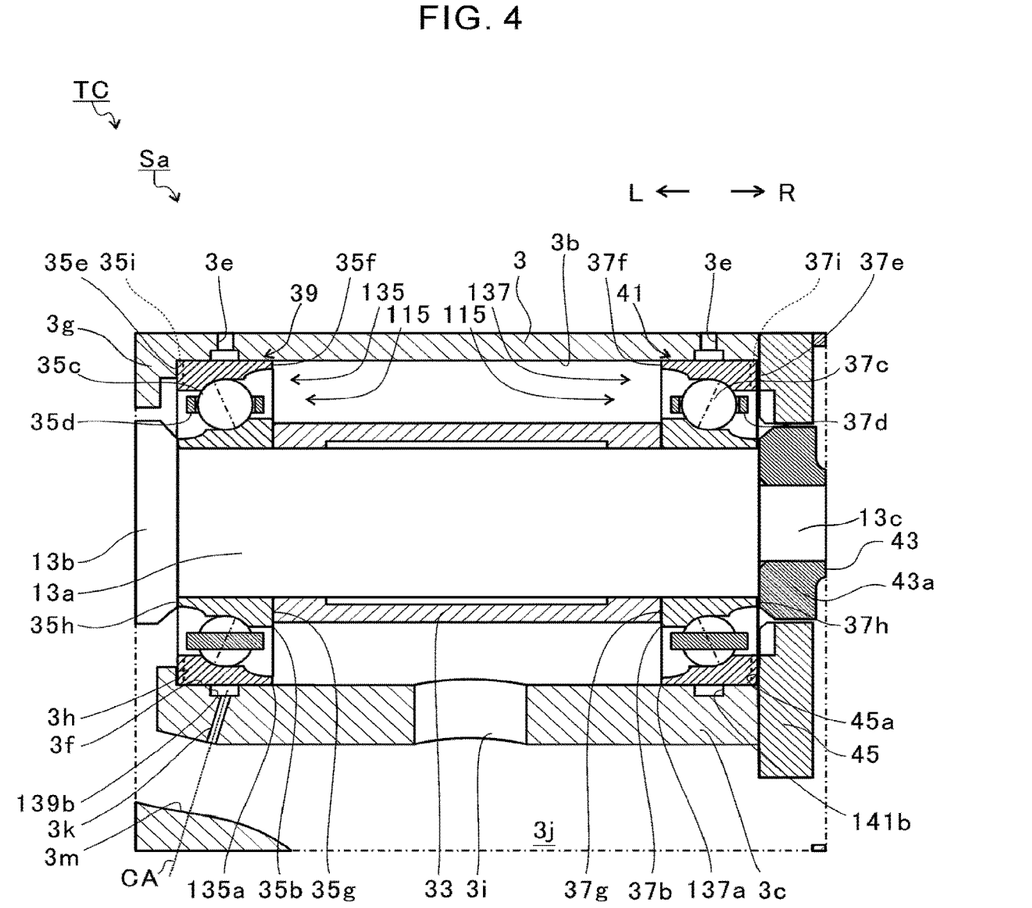
FIG. 4 is a schematic sectional view for illustrating a bearing structure of a modification example.

FIG. 4 is a schematic sectional view for illustrating a configuration of a bearing structure Sa of a modification example. Components substantially equivalent to those of the bearing structure S of the above-mentioned embodiment are denoted by the same reference symbols, and a description thereof is omitted. As illustrated in FIG. 4, in the bearing structure Sa of this modification example, a pair of rolling bearings 115 are arranged in the bearing hole 3b. The pair of rolling bearings 115 include a turbine-side bearing 135 and a compressor-side bearing 137. The turbine-side bearing 135 includes an outer ring 135a. The outer ring 135a is different from the outer ring 35a (see FIG. 2) of the above-mentioned embodiment only in that the two annular protrusions 39a and the damper groove 39b (see FIG. 2) are not formed. The compressor-side bearing 137 includes an outer ring 137a. The outer ring 137a is different from the outer ring 37a (see FIG. 2) of the above-mentioned embodiment only in that the two annular protrusions 41a and the damper groove 41b (see FIG. 2) are not formed.

Damper grooves 139b and 141b are formed in the inner peripheral surface 3f of the bearing hole 3b (cylindrical portion 3c) of this modification example. The damper grooves 139b and 141b each have one end connected to the communication hole 3e, and another end opened to the inner peripheral surface 3f of the bearing hole 3b. The damper grooves 139b and 141b extend in an annular shape over the entire circumference of the inner peripheral surface 3f of the bearing hole 3b. The damper grooves 139b and 141b extend in the circumferential direction of the shaft 13. The damper grooves 139b and 141b are arranged at positions opposed to the outer rings 135a and 137a in the bearing hole 3b. The communication holes 3e communicate with the damper grooves 139b and 141b. The communication holes 3e are configured to allow the lubricating oil to be supplied to the damper grooves 139b and 141b. The lubricating oil supplied to the damper grooves 139b and 141b flows out to gaps between an outer peripheral surface of the outer rings 135a and 137a and the inner peripheral surface 3f of the bearing hole 3b. The lubricating oil forms oil films (oil-film dampers) between the outer peripheral surface of the outer rings 135a and 137a and the inner peripheral surface 3f of the bearing hole 3b.

The second oil drain hole 3k has one end communicating with the damper groove 139b, and another end opened to the outside of the cylindrical portion 3c. The second oil drain hole 3k is configured to allow the lubricating oil in the damper groove 139b to be discharged to the outside of the cylindrical portion 3c. Accordingly, the second oil drain hole 3k can curb excessive accumulation of the lubricating oil in the damper groove 139b. As a result, degradation in bearing characteristics of the turbine-side bearing 135 can be curbed.

One embodiment of the present disclosure has been described above with reference to the attached drawings, but the present disclosure is not limited to the above-mentioned embodiments. It is obvious that a person skilled in the art can conceive of various alternations and modifications within the scope of claims, and those examples are construed as falling within the technical scope of the present disclosure.

In the above-mentioned embodiment, a description has been given of the example in which the damper grooves 39b and 41b are formed in the outer rings 35a and 37a. Further, in the above-described modification example, a description has been given of the example in which the damper grooves 139b and 141b are formed in the inner peripheral surface 3f of the bearing hole 3b. However, the configuration is not limited thereto, and the damper grooves 39b, 41b, 139b and 141b may be formed in both of the outer peripheral surface of the outer rings 35a and 37a and the inner peripheral surface 3f of the bearing hole 3b. That is, the damper grooves 39b, 41b, 139b and 141b may be formed in at least one of the outer peripheral surface of the outer rings 35a and 37a or the inner peripheral surface 3f of the bearing hole 3b.

In the above-mentioned embodiment and the modification example, a description has been given of the example in which the oil-drain-hole smallest flow passage sectional area is equal to or smaller than the value obtained by subtracting the one-side smallest gap area and the another-side smallest gap area from the communication-hole smallest flow passage sectional area. However, the configuration is not limited thereto, and the oil-drain-hole smallest flow passage sectional area may be larger than the value obtained by subtracting the one-side smallest gap area and the another-side smallest gap area from the communication-hole smallest flow passage sectional area.

In the above-mentioned embodiment and the modification example, a description has been given of the example in which the one end of the second oil drain hole $3k$ is formed at the position of the bearing hole $3b$ on the lowermost side in the vertical direction. However, the configuration is not limited thereto, and the one end of the second oil drain hole $3k$ may be formed at a position vertically upper side with respect to the lowermost position in the vertical direction, in the bearing hole $3b$. However, in the bearing hole $3b$, the one end of the second oil drain hole $3k$ is formed at a position different from where the communication hole $3e$ is connected.

In the above-mentioned embodiment and the modification example, a description has been given of the example in which the single (one) second oil drain hole $3k$ communicates with the damper groove $39b$ or $139b$. However, the configuration is not limited thereto, and the second oil drain hole $3k$ may communicate with the damper groove $39b$ or $139b$ at a plurality of positions in the circumferential direction. That is, a plurality of second oil drain holes $3k$ may be arranged in the circumferential direction. The plurality of second oil drain holes $3k$ may be arranged at equal intervals or unequal intervals in the circumferential direction.

In the above-mentioned embodiment and the modification example, a description has been given of the example in which the extension line of the center axis CA of the second oil drain hole $3k$ intersects with the housing wall surface $3m$. However, the configuration is not limited thereto, and the extension line of the center axis CA of the second oil drain hole $3k$ may not intersect with the housing wall surface $3m$. For example, the lubricating-oil discharge oil passage $3j$ may be arranged on the extension line of the center axis CA of the second oil drain hole $3k$.

In the above-mentioned embodiment and the modification example, a description has been given of the example in which the outer rings $35a$, $37a$, $135a$ and $137a$ of the rolling bearings 15 and 115 are provided so as to be rotatable with respect to the bearing hole $3b$. However, the configuration is not limited thereto, and the outer rings $35a$, $37a$, $135a$ and $137a$ of the rolling bearings 15 and 115 may be provided so as to be non-rotatable with respect to the bearing hole $3b$.

In the above-mentioned embodiment and the modification example, a description has been given of the example in which the rolling bearings 15 are the angular contact bearings. However, the configuration is not limited thereto, and the rolling bearings 15 may be, for example, deep groove ball bearings or self-aligning ball bearings.

In the above-mentioned embodiment and the modification example, a description has been given of the example in which the rolling bearings 15 are arranged in the face-to-face duplex combination. However, the configuration is not limited thereto, and the rolling bearings 15 may be arranged in a so-called back-to-back duplex combination (combination in which the contact angles form directions of lines separating away from each other toward the inner ring side).

In the above-mentioned embodiment and the modification example, a description has been given of the case in which the two rolling bearings 15 are provided so as to be spaced apart from each other in the axial direction in the bearing hole $3b$. However, the configuration is not limited thereto, and a single (one) rolling bearing 15 may be arranged. Further, a plurality of (three or more) rolling bearings 15 may be arranged in the bearing hole $3b$.

In the above-mentioned embodiment and the modification example, a description has been given of the example in which the bearing structure S is applied to the turbocharger TC. However, the bearing structure S is not limited to the turbocharger TC, and is applicable to various rotary machines.

INDUSTRIAL APPLICABILITY

The present disclosure can be used for the bearing structure.

What is claimed is:

1. A bearing structure, comprising:
    a housing including a cylindrical portion having a bearing hole;
    a communication hole that is formed in the housing, and is configured to allow communication between the bearing hole and a lubricating-oil supply oil passage;
    a rolling bearing that is arranged in the bearing hole, a shaft being inserted through the rolling bearing;
    a damper groove formed in at least one of an outer peripheral surface of an outer ring of the rolling bearing or an inner peripheral surface of the bearing hole so as to extend in a circumferential direction of the shaft; and
    an oil drain hole having one end communicating with the damper groove, and another end opened to an outside of the cylindrical portion;
    wherein an oil-drain-hole smallest flow passage sectional area that is smallest in a flow passage sectional area of the oil drain hole is equal to or smaller than an area obtained by subtracting one-side smallest gap area that is smallest in a gap area defined between the outer ring and the inner peripheral surface of the bearing hole on one side of the damper groove in an axial direction of the shaft and another-side smallest gap area that is smallest in a gap area defined between the outer ring and the inner peripheral surface of the bearing hole on another side of the damper groove in the axial direction from a communication-hole smallest flow passage sectional area that is smallest in a flow passage sectional area of a communication hole.

2. The bearing structure according to claim 1, wherein the one end of the oil drain hole is formed at a position of the bearing hole on a lowermost side in a vertical direction.

3. The bearing structure according to claim 2,
    wherein the housing has a lubricating-oil discharge oil passage on a lower side in the vertical direction with respect to the bearing hole, and
    wherein an extension line of a center axis of the oil drain hole intersects with a housing wall surface that faces the lubricating-oil discharge oil passage.

4. The bearing structure according to claim 3, wherein the outer ring is provided so as to be rotatable with respect to the bearing hole.

5. The bearing structure according to claim 2, wherein the outer ring is provided so as to be rotatable with respect to the bearing hole.

6. The bearing structure according to claim 1,
    wherein the housing has a lubricating-oil discharge oil passage on a lower side in the vertical direction with respect to the bearing hole, and wherein an extension line of a center axis of the oil drain hole intersects with a housing wall surface that faces the lubricating-oil discharge oil passage.

7. The bearing structure according to claim 6, wherein the outer ring is provided so as to be rotatable with respect to the bearing hole.

8. The bearing structure according to claim 1, wherein the outer ring is provided so as to be rotatable with respect to the bearing hole.

\* \* \* \* \*